Nov. 24, 1964    S. B. PFEIFFER    3,158,738
DIGITAL-TO-ANALOG COMBINATIONAL CONVERTERS
Filed Oct. 21, 1957    9 Sheets-Sheet 1

INVENTOR
S. B. PFEIFFER
BY
Alan C. Rose
ATTORNEY

Nov. 24, 1964 S. B. PFEIFFER 3,158,738
DIGITAL-TO-ANALOG COMBINATIONAL CONVERTERS
Filed Oct. 21, 1957 9 Sheets-Sheet 2

INVENTOR
S. B. PFEIFFER
BY
Alan C. Rose
ATTORNEY

Nov. 24, 1964     S. B. PFEIFFER     3,158,738
DIGITAL-TO-ANALOG COMBINATIONAL CONVERTERS
Filed Oct. 21, 1957     9 Sheets–Sheet 5

FIG. 7C

| RELAY NO. | TRANS. | FROM TERMINAL | TO TERMINAL |
|---|---|---|---|
| 61 (S) | $T_4$ | B | A |
| 62 (T) | $T_4$ | C | D |
| 63 (U) | $T_8$ | C | B |
| 64 (V) | $T_{12}$ | C | L |
| 65 (W) | $T_{14}$ | C | M |
| 66 (X) | $T_{16}$ | C | N |
| 67 (Y) | $T_{18}$ | C | P |
| 68 (Z) | $T_{20}$ | R | Q |

INVENTOR
S. B. PFEIFFER
BY *Alan C. Rose*
ATTORNEY

Nov. 24, 1964

S. B. PFEIFFER 3,158,738

DIGITAL-TO-ANALOG COMBINATIONAL CONVERTERS

Filed Oct. 21, 1957

INVENTOR
S. B. PFEIFFER

BY

*Alan C. Rose*

ATTORNEY

United States Patent Office 3,158,738
Patented Nov. 24, 1964

3,158,738
DIGITAL-TO-ANALOG COMBINATIONAL
CONVERTERS
Sigmund B. Pfeiffer, New Providence, N.J., assignor to
Bell Telephone Laboratories, Incorporated, New York,
N.Y., a corporation of New York
Filed Oct. 21, 1957, Ser. No. 691,491
11 Claims. (Cl. 235—187)

This invention relates to circuitry for modifying analog input signals in accordance with digital information, and is particularly applicable to systems employing synchro or resolver type devices.

In systems employing synchro or resolver devices, the signals representing the angular position of a rotor may be termed "spacial" signals. In the conventional synchro systems for aviation purposes, three standard 400 cycle signals are employed to represent the position of a rotor. The three signals are either in phase or 180° out of phase with each other, and the three signals always have a combination of R.M.S. (root mean square) values and phase states which uniquely represent the position of the rotor. The plot of the R.M.S. values of the three signals versus the indicated rotor position resembles three sine waves staggered by 120° with respect to each other, with negative values being identified by a 180° reversal in phase.

The three spacial voltage signals mentioned above include more information than is required for the full identification of an angular position. Two spacial voltages are, in fact, sufficient to represent an angular orientation, and such a representation is employed in resolver units in analog computers, for example. The plot of R.M.S. value versus orientation of these two spacial voltages has the appearance of two sine waves staggered by 90°.

Now, with the increased use of digital computers, it is often desirable to position synchros or resolvers in accordance with digital information. My Patent 2,803,003, granted August 13, 1957, and my application Serial No. 587,281, filed May 25, 1956, now Patent 2,817,078, issued December 17, 1957, are directed to circuitry for developing spacial voltages from digital input signals. Another related problem involves the positioning of a synchro or a resolver in accordance with the difference of two input position signals. In the past, this function has normally been implemented by a mechanical differential structure having a three phase stator and rotor. In addition, when one of the input signals is in digital form, complex and expensive conversion equipment may be required to change the digital information into a shaft position for orienting the rotor of the differential device.

Accordingly, the principal object of the present invention is to simplify and reduce the cost of differential circuitry for synchro or resolver type systems.

In accordance with the present invention, the foregoing object is accomplished through the use of impedance switching networks which progressively shift spacial input voltages in accordance with digital input signals.

In accordance with a feature of the invention, a first set of spacial voltages representing a variable angle is coupled to switching circuitry which is controlled by digital signals representing another angle, and an impedance network coupled to said switching circuitry produces a second set of spacial voltages representing a combination of the two angles.

In accordance with another feature of the invention, the input spacial voltages in the system mentioned above are sine and cosine functions of the variable angle, and the impedance network includes two channels.

In accordance with a further feature of the invention, the digital input signals are in the reflected binary code, and the switching circuitry associated with each digit of the code is arranged to change the magnitude of the voltage in each of the channels of the impedance network in accordance with the value indicated by the "reflection lines" associated with each digit of the reflected binary code.

In accordance with an additional feature of the invention, the digital input signals are in the normal binary code, and the two channels of the impedance network have several sets of cross-connections controlled by the digital switching system to provide trimming voltages in the two channels.

The advantages of the present differential circuits include very considerable reductions in the cost, bulk, and power requirements of the equipment as contrasted with conventional synchro systems. These advantages are particularly important in the mobile or airborne systems to which the present circuits have obvious applications.

Other objects, features, and advantages of the invention may be readily understood from a consideration of the following detailed description and the accompanying drawing, in which:

FIG. 8, which includes

Figure 1:
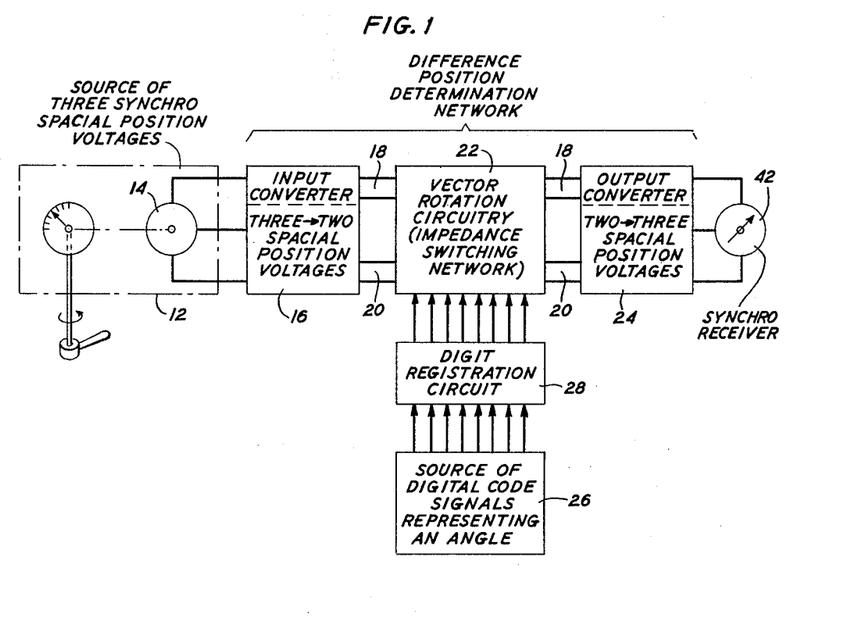
FIG. 1 is a block diagram of an illustrative circuit in accordance with the invention in which spacial position voltages are modified by digital input signals.
Figure 3:
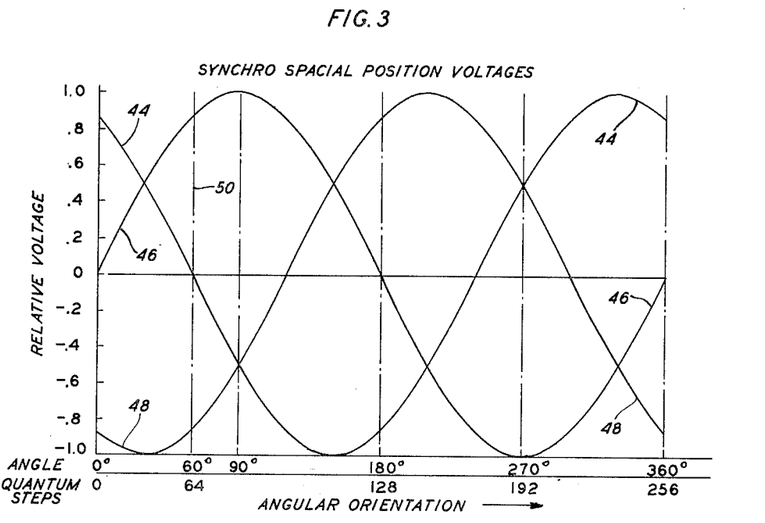
FIG. 3 is a plot of the three spacial output voltages from a synchro transmitter plotted against the angular orientation of the rotor of the synchro.
Figure 4:
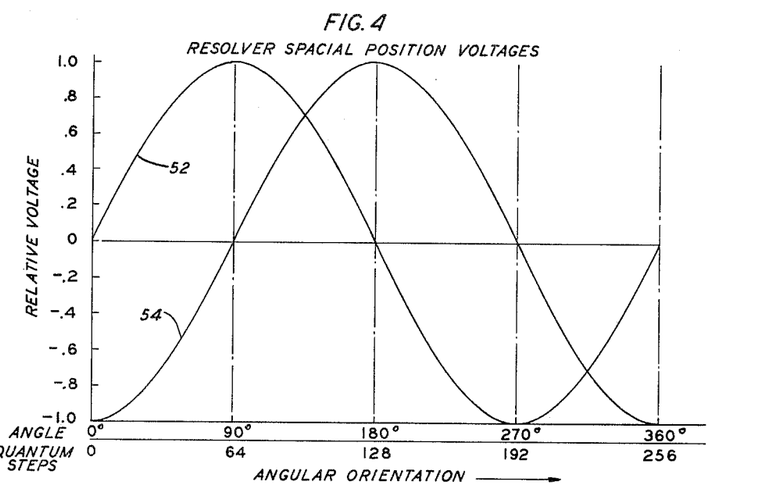
FIG. 4 is a plot of two spacial voltages versus angular orientation.

In the block diagram of FIG. 1, which is an illustrative showing of a system in accordance with the invention, the block 12 represents a source of three spacial position voltages. As discussed above, the three spacial position voltages may indicate the orientation of the rotor of the synchro generator 14. The three output signals from the synchro generator 14 are applied to the circuit 16, which converts the input signals of three spacial position voltages to two spacial position voltages. It may be noted in passing that FIGS. 3 and 4 show diagrams of three spacial position voltages and two spacial position voltages, respectively, as plotted against angular orientation. These figures are included for reference purposes, and will be referred to frequently throughout the present description.

The two spacial position voltages are applied to channels 18 and 20, which are included in the difference position determination network. The two channels 18 and 20 may be identified throughout the vector rotation circuitry 22 up to the output conversion circuit 24. It may be noted that there are many cross-connections between channels 18 and 20 in the vector rotation circuitry 22, and that the signals appearing on the two channels to the right of the circuitry 22 are not identical with those which are applied to it from the input converter 16. Digital signals representing an angle are applied to the vector rotation circuitry 22 by the source 26 and the digit registration circuitry 28. The output signal from the vector rotation circuit 22 is a pair of spacial position voltages which depends both on the variable input spacial position voltages applied on channels 18 and 20 and the digital position voltages supplied by the source 26. In the illustrative circuits which will be considered in detail, the angle as indicated by the digital source 26 is subtracted from the angular representation provided by the input converter 16. It is to be understood, however, that the circuit 22 may readily be adapted to provide an addition rather than a subtraction function, and that other modifications are also possible.

Figure 2:
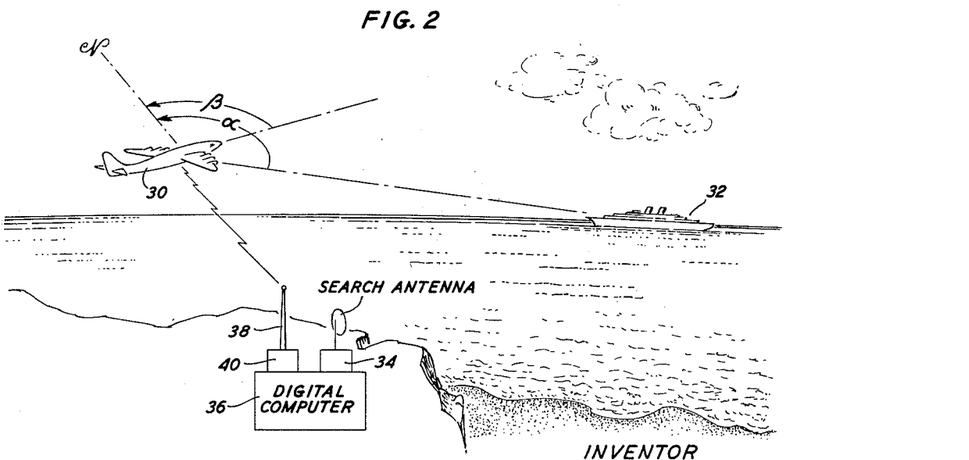
FIG. 2 is a diagram indicating one possible field of use for the circuits of FIG. 1.

The circuit of FIG. 2 indicates one possible application for the system shown in block diagram form in FIG. 1. In FIG. 2, the airplane 30 is searching for the ship 32. A search radar unit 34 determines the position of both the airplane 30 and the ship 32. The digital computer 36 is associated with the radar equipment 34 and determines the bearing of the ship 32 from the airplane 30. In the diagram of FIG. 2, this bearing is designated $\alpha$. It is desirable to provide a display for the pilot in airplane 30 having an indicator which points directly toward the ship 32. Assuming that the indicator is a pointer attached to the rotor of a synchro in airplane 30, the rotor of the synchro must assume a position equal to the angle $\alpha$ less the angle $\beta$, which is the bearing of the airplane 30 with respect to north. The angle $\beta$ may readily be represented by spacial output voltages from a synchro associated with the gyro compass equipment of the airplane 30. Digital signals representing the angle $\alpha$ are applied from computer 36 to the radio transmitter 40. Modulated output signals are transmitted from antenna 38 to the airplane 30. Within the airplane 30, the digital signals are detected and registered by a circuit such as that indicated at 28 in FIG. 1. With the circuit of FIG. 1 being located in the airplane, the rotor of the synchro receiver 42 assumes a position indicating the angular location of the ship 32 with respect to the frame of reference of the airplane 30. Accordingly, the pilot of the plane 30 is not required to waste time computing the bearing of the ship 32 from raw data, but need only follow the indication of the pointer which is aimed directly at the ship 32.

As mentioned above, the plots of FIGS. 3 and 4 represent spacial position voltages which are employed in synchro or resolver systems. In FIG. 3, the three output voltages from a synchro transmitter are plotted against the angular orientation of the rotor of the synchro transmitter. Negative values are indicated by a reversal of phase of the standard frequency signal as compared with the standard phase employed to represent positive signals.

In FIG. 3, the three spacial position voltages are designated 44, 46, and 48. The three voltages 44, 46, and 48, which may, for example, appear at the output of block 12 in FIG. 1, uniquely represent the orientation of the rotor of the synchro generator 14. Referring to FIG. 3, it may be noted that the vertical dash-dot line 50 is drawn at an angle which is approximately 60°. Under these circumstances, the wave form 44 is approximately equal to 0, the wave form 46 is approximately equal to .85 of its maximum value, and the wave form 48 is approximately equal to .85 of its minimum value. Examination of the entire set of plots as shown in FIG. 3 indicates that the angle of 60° is the only one in which the three voltages have these magnitudes and polarities. Similarly, every angle is uniquely determined by a set of three different voltages.

The three spacial voltages represented in FIG. 3 include more information than is actually necessary to uniquely define an angular position. However, any one of the spacial position voltages includes insufficient information to exactly determine a single angle. Thus, for example, referring to the plot 46 of FIG. 3, it has a value of 0 both at an angle of 0° and at an angle of 180°. To resolve ambiguities of this type, at least one additional spacial position voltage is required.

In the plot of FIG. 4, the wave forms 52 and 54 constitute a pair of spacial position voltages. The second spacial position voltage 54 serves to resolve the ambiguities of angular position of the first spacial voltage 52. Thus, when the voltage 52 is 0, it may represent either 0° or 180°. However, the negative or positive values of the position voltage 54 resolve this ambiguity and indicate whether the designated voltage is actually 0° or 180°. The spacial position voltages as shown in FIG. 4 are actually employed in analog computer resolvers to designate any desired angle.

Figure 5:
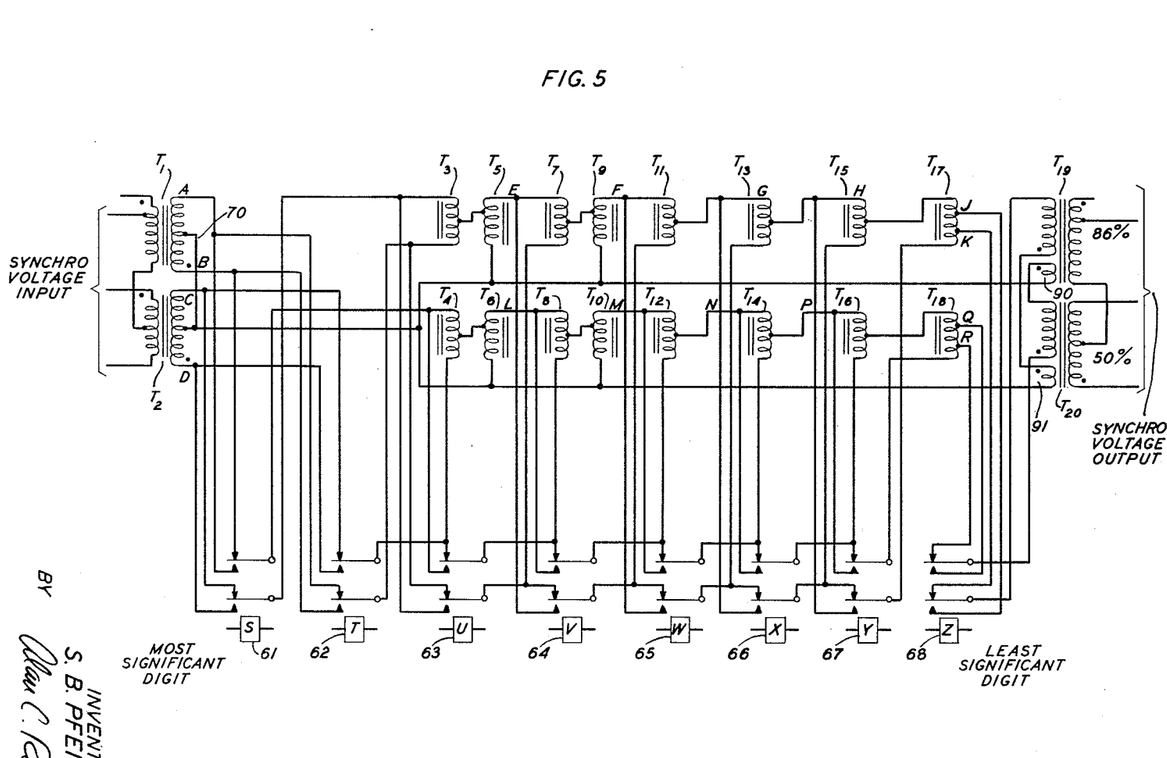
FIG. 5 is a circuit diagram of an illustrative embodiment of the invention in which digital input signals are in the so-called reflected binary code.

FIG. 5 is a detailed circuit diagram of one version of the difference position determination network of FIG. 1. In FIG. 5, the three-phase input signal is applied to the transformers $T_1$ and $T_2$. The transformers $T_1$ and $T_2$ are "Scott" transformers, and serve to transform spacial position voltages including three voltages as shown in FIG. 3 into spacial position voltages including only two voltages as shown in FIG. 4. The two spacial position voltages appear on the secondaries to the right of transformers $T_1$ and $T_2$. The Scott transformer arrangement as shown at $T_1$ and $T_2$ in FIG. 5 has a tap at a point which is .86 of the way across the primary winding. The transformer arrangement at $T_{19}$ and $T_{20}$ at the output of the difference determination network also includes a Scott transformer arrangement for reconverting from two to three spacial voltages.

The principal portion of the circuit of FIG. 5 includes the transformers $T_3$ through $T_{18}$. It may be noted that these transformers include both standard types of transformers and autotransformers, and that many taps appear on the transformer windings. The digit registration circuit 28 of FIG. 1 is implemented in FIG. 5 by the relays 61 through 68. The energization of the relays 61 through 68, representing a given angle, produces changes in the interconnections of the transformers $T_1$ through $T_{20}$. With these circuit connections, a set of spacial position voltages representing the difference between the angle indicated by the voltages applied to transformers $T_1$ and $T_2$ and that indicated on relays 61 through 68, appears at the output of transformers $T_{19}$ and $T_{20}$.

Figures 6A, 6B, 6C:
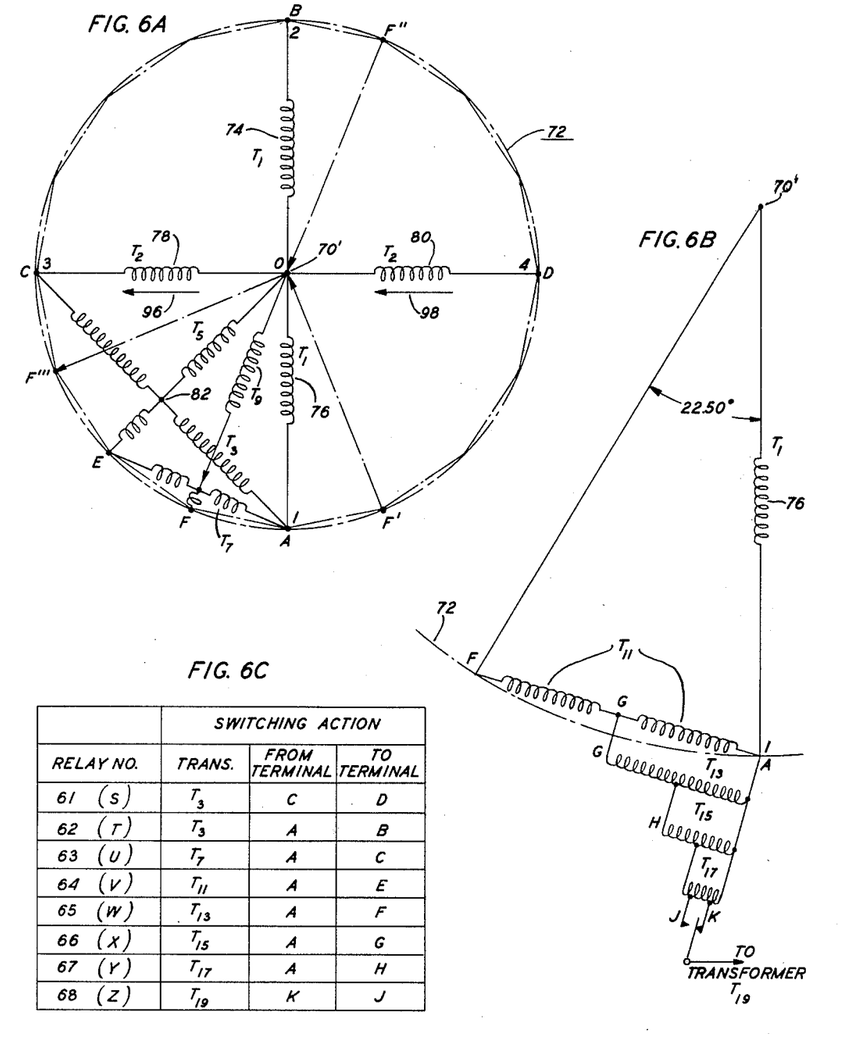
FIGS. 6A and 6B are combined circuit and vector diagrams which are useful in understanding the mode of operation of a part of the circuit of FIG. 5.
FIG. 6C is a table indicating the transformer tap connections for one channel of the circuit of FIG. 5.

The mode of operation of the circuit of FIG. 5 may be most readily understood by reference to the combined circuit and vector diagrams of FIGS. 6A, 6B, 7A, and 7B. In FIG. 5, it may be noted that the center taps of the secondaries of the transformers $T_1$ and $T_2$ are connected together. In FIG. 5 this interconnection is designated lead 70. The center point in the diagram of FIG. 6A is designated 70' to indicate correspondence with the voltage point indicated by lead 70 in FIG. 5. All of the voltages developed in the course of the description of FIG. 6A are developed between point 70', which is also designated "O," and a point substantially on the periphery of the dash-dot circle designated 72.

For convenience in the development of the diagram of FIG. 6A, the secondary of the transformer $T_1$ is shown vertically and includes the two windings 74 and 76 spaced by the point 70'. Similarly, the secondary windings 78 and 80 of transformer $T_2$ are shown horizontally in the diagram of FIG. 6A. The remainder of the diagram of FIG. 6A shows the transformers included in the upper channel of FIG. 5 with the connections in the position shown in FIG. 5 with all of the relays 61 through 68 being de-energized. It may also be noted that the letters A through F in FIG. 6A and letters A, F, G, H, and J in FIG. 6B have corresponding circuit points designated in the circuit of FIG. 5. The transformer $T_3$ is connected from one side of transformer $T_1$ to one side of transformer $T_2$. In FIG. 6A the transformer $T_3$ is shown along a chord of the circle 72 between the points A and C which lie on the circumference of the circle. The midpoint 82 of transformer $T_3$ falls short of the circumference of the circle 72. An autotransformer $T_5$ is therefore provided to increase the magnitude of the output voltage at point E. In a similar manner, the transformer $T_7$ interconnects points A and E on the periphery of circle 72 and the autotransformer $T_9$ is provided to increase the magnitude of the voltage at the midpoint of transformer $T_7$. The output from transformer $T_9$ is designated F.

The diagram of FIG. 6B represents an enlargement of a portion of the diagram of FIG. 6A. Specifically, the points A and F in FIG. 6B correspond to the points A and and F in FIG. 6A. The transformer $T_{11}$ extends from point A to point F on the periphery of the circle 72, and has a center tap designated point G. Similarly, transformer $T_{13}$ extends from point A to point G, bridging half of transformer $T_{11}$. The transformer $T_{15}$ extends from point A to a center tap on transformer $T_{13}$ designated point H. In a similar manner, transformer $T_{17}$ extends from point A to the center tap of transformer $T_{15}$. The two taps on transformer $T_{17}$ are designated J and K. As will be discussed in more detail hereinafter, the voltage shift between points J and K of transformer $T_{17}$ corresponds to a shift of about 1°35' in angle, or one digit in the input code applied to relays 61 through 68.

Figure 8A:
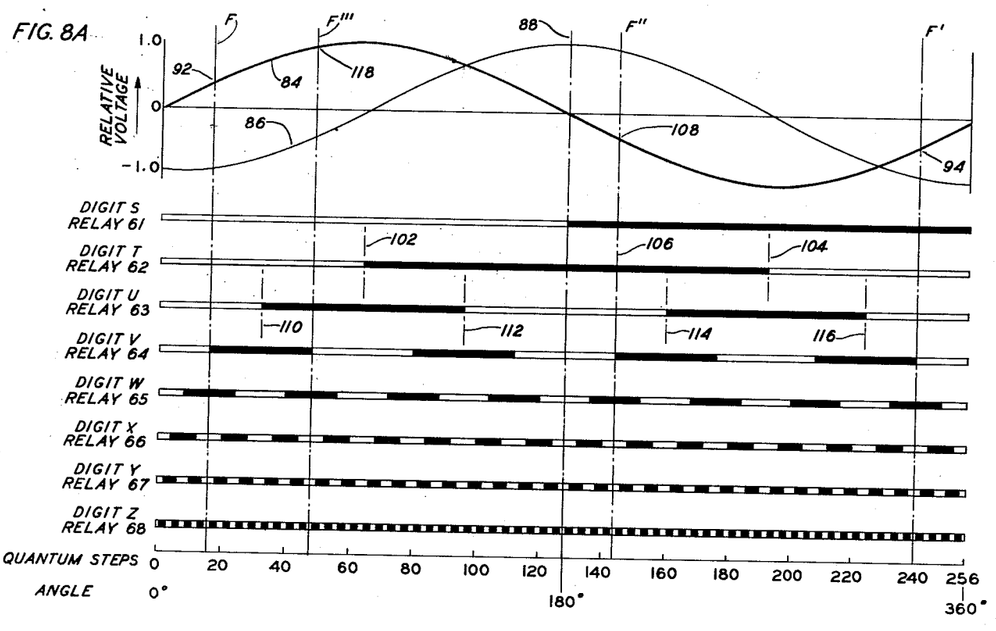
FIGS. 8A and 8B, is a diagram of reflected binary code indications and the corresponding output voltages for the circuit of FIG. 5.
Figure 8B:
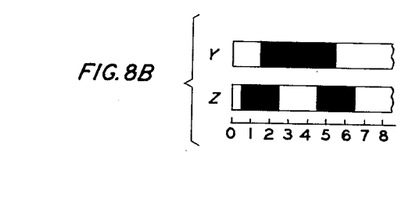

In Table I set forth below, a tabulation is made of the decimal number, the corresponding binary number, and the equivalent reflected binary number. The table of FIG. 1 only extends to four-digit binary numbers; however, the table may readily be extended to include the full 256 distinct digital combinations which may be established on relays 61 through 68. FIG. 8, which will be discussed below, shows the full 256 quantums in terms of the reflected binary code digits, and indicates the spacial voltages represented by the various combinations of digital signals.

*Table I*

| Decimal No. | Normal Binary Code | Reflected Binary Code |
| --- | --- | --- |
| 0 | 0000 | 0000 |
| 1 | 0001 | 0001 |
| 2 | 0010 | 0011 |
| 3 | 0011 | 0010 |
| 4 | 0100 | 0110 |
| 5 | 0101 | 0111 |
| 6 | 0110 | 0101 |
| 7 | 0111 | 0100 |
| 8 | 1000 | 1100 |
| 9 | 1001 | 1101 |
| 10 | 1010 | 1111 |
| 11 | 1011 | 1110 |
| 12 | 1100 | 1010 |
| 13 | 1101 | 1011 |
| 14 | 1110 | 1001 |
| 15 | 1111 | 1000 |

In the foregoing table, the reflected binary code may be compared with the normal binary code. The reflected binary code is characterized by the fact that a change of one digit position only produces a change in one of the four binary digits making up the reflected binary member. Thus, for example, the normal binary code corresponding to the number 7 is the sequence 0111, and the normal binary code for the number 8 is the combination 1000. In the reflected binary code, however, the designation for the decimal number 7 is 0100, and for the decimal number 8 is 1100. It may be observed that there is a change of only one digit between the coded group designating the decimal digit 7 and that designating the decimal digit 8. When the normal binary code is employed, there is a danger that the premature transition of one digit position may introduce an error of several quantum steps. Thus, for example, if the left-hand digit is changed from a "0" to a "1" prior to the transition of the less significant digits in the change in binary numbers corresponding to the change from the decimal digit 7 to the decimal digit 8, the resulting combination would appear to be the code group 1111, corresponding to the decimal number 15. This potential source of error is eliminated through the use of the reflected binary code.

It will now be shown that the circuit of FIG. 5 performs the desired function of producing a set of spacial position voltages representing the difference between the angle represented by the voltages introduced at transformers $T_1$ and $T_2$ and that represented by relays 61 through 68. This demonstration will be divided into two portions. First, it will be shown that a shift in the input spacial voltages applied to transformers $T_1$ and $T_2$ produces a corresponding shift in the output spacial voltages. Thereafter, it will be shown that a change in the state of relays 61 through 68 produces a corresponding change in the output voltages. It will also be shown that the amount of change introduced by the digital input on relays 61 through 68 is independent of the spacial voltages applied to transformers $T_1$ and $T_2$.

It has been mentioned above that the diagrams of FIGS. 6A and 6B are drawn to represent the state of the upper or odd channel of the differential circuit of FIG. 5. A similar set of diagrams for the even channel appears in FIGS. 7A and 7B and will be discussed briefly at a later point in the specification. The output from the upper or odd channel in FIG. 5 corresponds to one of the two spacial voltages of the type shown in FIG. 4. With the connections as indicated in FIGS. 6A and 6B, the output voltage will be that developed between the points 70' and K in FIG. 6B. This voltage very nearly corresponds to that developed across winding 76 associated with transformer $T_1$. Assuming that the relays 61 through 68 remain in their de-energized states, the output voltage applied to the primary of transformer $T_{19}$ corresponds substantially to that voltage which appears between the center tap and terminal A of the transformer $T_1$.

In the circuit of FIG. 5, the voltages at the outputs of transformers $T_1$ and $T_2$ correspond respectively to a pair of voltages such as those shown in FIG. 4. Thus, for example, assuming that the voltage appearing at the output of transformer $T_1$ is initially 0, then the signal at the secondary of transformer $T_2$ initially has a maximum value. The resultant output voltage between point 70' and point A will therefore be substantially equal to 0. Thus, the output voltage from the upper channel in the circuit of FIG. 5 generally corresponds to the voltage developed across one half of transformer $T_1$ under the assumed condition of the relays 61 through 68. Accordingly, when the input spacial signals change so that transformer $T_1$ has a substantial output, the output signal to transformer $T_{19}$ has a corresponding increase in value. In a similar manner, the spacial signal passing through the lower or even channel in FIG. 5 from the output of transformer $T_2$ to the input of transformer $T_{20}$ changes with changes in the value of the applied spacial voltage.

In the foregoing paragraph, it has been shown that the signal applied to transformers $T_{19}$ and $T_{20}$ is dependent on the spacial voltages which appear at the secondary of transformers $T_1$ and $T_2$. The effect of changes of the digital input signals as represented by the sets of relays 61 through 68 will now be considered. In general, the energization of relays 61 through 68 has the effect of changing the connections of transformers in both the odd and even channels. More particularly, the changes in transformer taps are set forth in the table of FIG. 6C for the upper or odd channel of FIG. 5, and the letters in the table refer to the terminals designated by letters in FIGS. 5, 6A, and 6B.

To understand the operation of the circuit of FIG. 5, attention must be directed both to the modified circuit shown in FIG. 6A, to the table of FIG. 6C, and to the diagram of FIG. 8. FIG. 8 shows the reflected binary code signals produced by the relays 61 through 68 in graphical form. In addition, the two spacial position wave forms 84 and 86 are shown at the top of FIG. 8 to correlate the combinations of reflected binary digital inputs with the spacial wave forms which they represent. In examining the diagram of FIG. 8, it may be noted that the vertical dash-dot line 88 which runs through the center of the diagram is a "reflection line" for the most significant digit S of the reflected binary code. Thus, the change of the digit S from a "0," as represented by the shaded portion of the strip representing digit S to a "1," as represented by the unshaded portion of the strip, shifts the digital representation about the dash-dot line 88. Thus, if the digital number was a given number of quantum steps above the dash-dot line 88 prior to the energization of relay 61, the resulting number will be below the dash-dot line 88 by an equal number of quantum steps.

The interpretation of the diagram of FIG. 6A, the table of FIG. 6C, and the diagram of FIG. 8 will now be continued through the consideration of certain specific circuit conditions. Initially, it will be assumed that the input spacial position signals are such that the secondary of transformer $T_2$ is energized, and that the secondary of transformer $T_1$ is de-energized. Now, with reference to the diagram of FIG. 6A, the voltages applied to transformer $T_{19}$ are developed in terms of the vertical component of the voltages between point 70' and the periphery of the circle 72. As mentioned above, when none of the relays 61 through 68 are energized, the output voltage is developed between 70' and point A. In view of the fact that this vector is substantially perpendicular to the energized windings of transformer $T_2$, little or no output voltage is applied to transformer $T_{19}$.

With the conditions assumed in the foregoing paragraph, attention is directed to the plot 84 at the top of FIG. 8, which is drawn more heavily than the related spacial position voltage 86. The condition described in the preceding paragraph, in which none of the relays are energized, corresponds to an output voltage at 0 or 360° in FIG. 8. The amplitude of the spacial position voltage 84 at these points has the expected value of 0. It may be noted that the angles from 0 to 360° are divided into 256 quantum steps. The quantum step positions designated 0 and 256 do not coincide precisely with the angles 0 and 360°. The one-half quantum phase shift discrepancy is required by the nature of the reflected binary encoding scheme. In view of the constant nature of this discrepancy, it is readily corrected by the coils 90 and 91, which are associated with transformers $T_{19}$ and $T_{20}$, respectively, in the circuit of FIG. 5. This phenomenon is explained in somewhat greater detail in my Patent 2,803,003 cited above.

To continue the description of the diagrams of FIGS. 6A and 8, it will be assumed that relay 65, corresponding to digit W, is energized. With reference to the table of FIG. 6C and the circuit diagram of FIG. 6B, it may be seen that the end of transformer $T_{13}$ previously connected to point A is switched to point F. The resulting output voltage to transformer $T_{19}$ is determined by the projection of the vector OC on the vector OF. In this case, the letter O has been used to indicate the center point 70' of the diagram of FIG. 6A. The vertical dash-dot line F in FIG. 8 indicates the angular position which corresponds to the energization of relay W. In fact, this corresponds to quantum step 15. The vertical dash-dot line F intersects plot 84 at point 92. Accordingly, the R. M. S. value of the voltage applied to transformer $T_{19}$ is indicated by the point 92 on the curve 84 in FIG. 8.

It will now be assumed that relay 61, corresponding to digit S, is energized in addition to relay 65. This has the effect of changing one terminal of transformer $T_3$ from point C to point D, while the other terminal, connected to point A, remains connected to that point. The resulting vector is designated OF' in FIG. 6A. In addition, the vertical dash-dot line F' in FIG. 8 shows the new angle of 240 quantum steps designated by the energization of relays 61 and 65. It may be noted that the dash-dot line F' intersects the plot 84 at point 94, and represents a value which is equal in magnitude but opposite in sign to the magnitude represented by point 92. It may be recalled that the sign of spacial position voltages is indicated by a change in phase of 180° of the spacial position voltage. With reference to FIG. 6A, it may be noted that the projection of vector OD on vector OF' is equal to the projection of vector OC on vector OF which was considered above. However, the reference arrows 96 and 98 associated with the two portions 78 and 80 of the secondary of transformer $T_2$ both point in the same direction. Accordingly, the vector OF is directed outwardly from the center of the circle 72 toward its periphery, whereas the vector OF' points inwardly toward the center of the circle. This reversal of polarity indicates a reversal in the phase of the two signals by exactly 180°, corroborating the earlier interpretation of point 94 on plot 84 in FIG. 8.

Proceeding one step further, the energization of relay 62 corresponding to digit T changes the connection of one end of transformer $T_3$ from point A to point B in the diagram of FIG. 6A. This has the effect of rotating vector OF' to the position designated OF". The two reflection lines for digit T are shown in FIG. 8 by the vertical dash-dot lines 102 and 104. In considering the effect of changing the state of relay 62, the reflection line which is closest to the quantum position prior to the energization of the relay is employed. Accordingly, with reference to the vertical dash-dot line F', the reflection line 104 is closer than the reflection line 102. The new angle which is designated by the closure of relays 61, 62, and 65, corresponding to digits S, T, and W, is indicated by the vertical dash-dot line 106 in FIG. 8. This corresponds to quantum step 143. The intersection of dashdot line 106 with curve 84 is designated point 108. The voltage represented by point 108 is both equal to and has the same sign as the voltage represented by point 94. This is corroborated by the identical projection of the vector OD on both vectors OF' and OF" in FIG. 6A.

It will now be assumed that relays 61 and 62 are de-energized, and that relay 63, corresponding to digit U, is energized in addition to relay W. As indicated in the table of FIG. 6C, this corresponds to the switching of one terminal of transformer $T_7$ from point A to point C, with the other terminal of transformer $T_7$ being connected to point E in both cases. This has the effect of moving vector OF to the position designated OF'''. The various reflection lines for digit U are indicated by the vertical dash-dot lines 110, 112, 114, and 116. The vertical dash-dot line F is closer to the U reflection line designated 110 than to the other reflection lines. Accordingly, the vertical dash-dot line F''' appears at quantum step 48 above the U reflection line 110, by the same amount that the line F appears below this reflection line. It may be noted that the vertical dash-dot line F''' intersects curve 84 at point 118. The voltage represented by point 118 has the same sign as the voltage represented by point 92, but is considerably greater in magnitude. This analysis is corroborated by the acute angle between vectors OF''' and OC in FIG. 6A, which produces a large projection of vector OC on vector OF'''. It may also be noted that the projection of vector OC on vector OF''' has the same sign as the projection of vector OC on the vector OF which was considered initially.

It may be noted that the taps J and K on transformer $T_{17}$ are not at the end nor at the center point of the transformer. Instead, they are at the one-quarter and three-quarter points. This arrangement is required to insure a one quantum phase shift when relays other than the Z relay 68 are operated in the normal progression through the reflected binary code.

In the foregoing paragraphs, the operation of the circuit of FIG. 5 has been analyzed by reference to certain specific angles and changes of angles. Through the use of FIGS. 6A through 6C and FIG. 8, the validity of the circuit connections and changes in connections corresponding to any possible digital input may readily be verified. It is also apparent that a change of the spacial input voltages would merely have the effect of rotating the reference vectors OA, OB, OC, and OD concurrently, and would not otherwise affect the analysis. Accordingly, the output spacial voltages to transformer $T_{19}$ and transformer $T_{20}$ represent the difference between the angles represented by the input spacial voltages and the digital signal applied to the circuit by the selective energization of relays 61 through 68, under all input signal conditions.

Figures 7A, 7B, 7C:
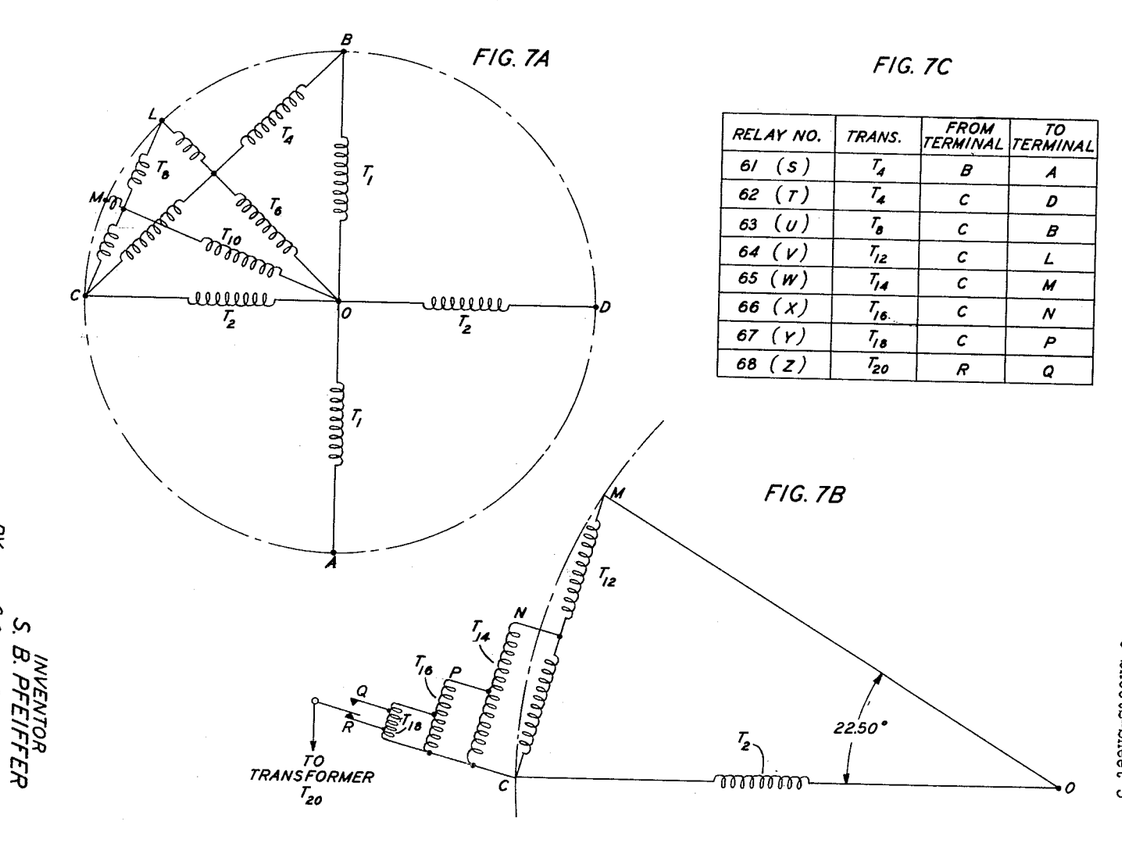
FIGS. 7A and 7B are additional circuit and vector diagrams applicable to the other of the channels of FIG. 5.
FIG. 7C is a table indicating the transformer connections for the channel of FIG. 5 shown in FIGS. 7A and 7B.

The analysis of the lower or even channel which is shown in diagrammatic form in FIGS. 7A and 7B is coextensive with the analysis of FIGS. 6A and 6B. Accordingly, it will not be repeated. It may be noted, however, that the lower or even channel produces the spacial position voltage 86 in FIG. 8A which serves to resolve possible ambiguities in the angular representation provided by the spacial position wave form 84, as discussed above. The point on the circle of FIG. 7A, corresponding to the voltage developed in the lower channel of FIG. 5, is shifted 90° with respect to the corresponding point in FIG. 6A for the same digital input signals. In addition, both reference points shift together in a clockwise direction with progressively increasing values of input digital signals. The letter designations in FIGS. 7A and 7B correspond to those which appear in the lower channel in the circuit of FIG. 5. It may also be noted that the table of FIG. 7C corresponds to that of FIG. 6C, and indicates the switching action resulting from changes of digital input signals.

The diagrams of FIGS. 6A, 6B, 7A and 7B can also be analyzed from a mathematical standpoint to show that the two output signals are sine and cosine functions, respectively, of the difference between the angle represented by the original input signals and the angle represented by the digital input signals. Initially, it may be noted that the original two input spacial voltages may be designated as functions of sine $\beta$ and cosine $\beta$, where $\beta$ is the angle which they represent. The signals on the secondary windings of transformers $T_1$ and $T_2$ may then be represented by the following equations:

$$T_{1A} = T_0 \cos \beta \quad (1)$$
$$T_{1B} = T_0 \cos \beta \quad (2)$$
$$T_{2C} = T_0 \sin \beta \quad (3)$$
$$T_{2D} = -T_0 \sin \beta \quad (4)$$

where $T_0$ represents the maximum amplitude of the voltages, and the letter designations identify the voltages with the appropriate secondary of one of the transformers.

Then, from the diagrams of FIGS. 6A and 7A, the following relationships are apparent:

$$T_{19} = T_{1A} \cos \alpha + T_{2C} \sin \alpha \quad (5)$$
$$T_{20} = T_{2C} \cos \alpha + T_{1B} \sin \alpha \quad (6)$$

where $T_{19}$ and $T_{20}$ are the output voltages to transformers $T_{19}$ and $T_{20}$, respectively, and $\alpha$ is the digital angle of the point in question on the periphery of the circles of FIGS. 6A and 7A.

The following equations are obtained by substituting Equations 1 through 4 in Equations 5 and 6:

$$T_{19} = T_0 \cos \beta \cos \alpha + T_0 \sin \beta \sin \alpha \quad (7)$$
$$T_{20} = T_0 \sin \beta \cos \alpha - T_0 \cos \beta \sin \alpha \quad (8)$$

Finally, by trigonometric identity, the following equations are obtained:

$$T_{19} = T_0 \cos (\beta - \alpha) \quad (9)$$
$$T_{20} = T_0 \sin (\beta - \alpha) \quad (10)$$

Equations 9 and 10 confirm the validity of the preceding explanation, and clearly show that the output special voltages represent sine and cosine functions of the difference between the two input angles.

Figures 9A, 9B, 10:
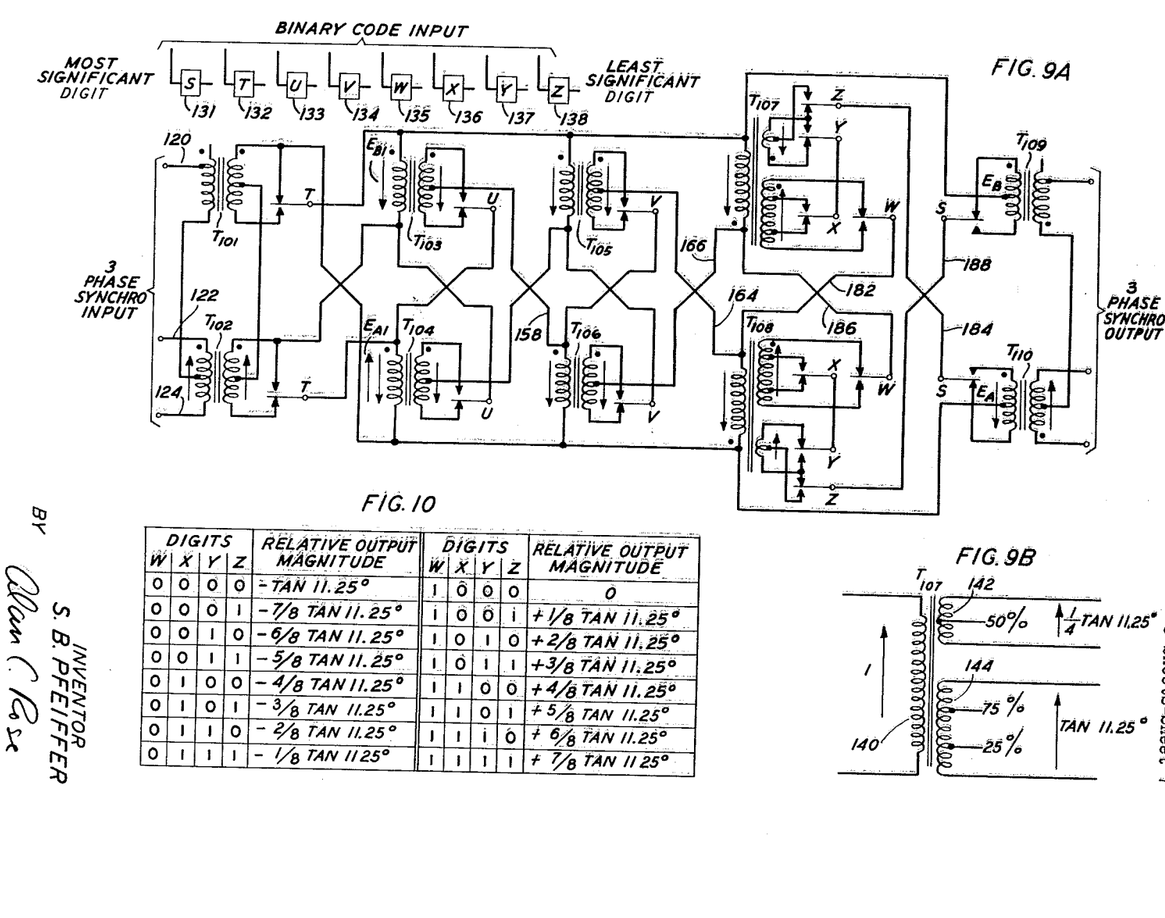
FIGS. 9A and 9B constitute a circuit diagram of another illustrative embodiment of the invention in which the digital input signals are in the normal binary code system.
FIG. 10 is a table indicating the mode of operation of a portion of the circuitry of FIGS. 9A and 9B.

The foregoing mathematical analysis represents about the last detailed consideration which will be given to the circuit of FIG. 5. The circuit of FIG. 5 will now be compared in a general way with the circuit of FIGS. 9A and 9B, and then detailed consideration will be given to this latter circuit. In the circuit of FIG. 5 as discussed above, the shift in the spacial position voltages is determined by digital signals in the reflected binary code. In the circuits of FIGS. 9A and 9B, however, the magnitude of the voltage shift is determined by digital signals in the normal binary code.

Although the details in the analysis of the two circuits are somewhat different, the over-all mode of operation of the two circuits is very nearly the same. In each case the input signal is a pair of spacial voltages having the relationship that one of the voltages has a value equal to A sine $\beta$, and the second has a value equal to A cosine $\beta$. In addition, each circuit includes a pair of channels connected by a switching network to both of the two input signals. The output voltage from the pair of channels in both cases is determined by impedance switching networks which progressively approximate a new set of spacial position voltages which are sine and cosine functions of a combination of the angle represented by the original pair of spacial position voltages and an additional angle, as represented by the digital input to the switching circuits. The switching networks are controlled by digital input signals either in the reflected or normal binary codes. In FIGS. 6A and 6B, for example, the circuitry shown in FIG. 6A produces a first approximation of the desired output voltage, and the linear evaluator circuitry of FIG. 6B provides an approximation which essentially amounts to stepping across the chord between points A and F. As noted in the preceding description, the transformer may be switched to various points around the circle 72 of FIG. 6A so that the evaluator may produce voltages corresponding to points along any of the sixteen chords drawn in dash-dot lines within circle 72.

Having noted the principal points of similarity between the systems using the reflected and the normal binary codes, the binary code system of FIGS. 9A and 9B will now be considered in detail. The transformers $T_{101}$ and $T_{102}$ have as inputs three spacial position voltages of the type shown in FIG. 3 applied to leads 120, 122, and 124. As in the case of the circuit of FIG. 5, the signals developed at the secondaries of transformers $T_{101}$ and $T_{102}$ are spacial position voltages of the type shown in FIG. 4. The transformers $T_{103}$ through $T_{108}$ are employed to develop the shifted spacial position voltages, corresponding to the difference in the angular representations provided by the original spacial voltages and the digital input signals. Output transformers $T_{109}$ and $T_{110}$ transform the spacial position voltages from a two-voltage signal into the three-voltage system suitable for application to the stator of a synchro. The switching networks connecting the various taps of transformers $T_{101}$ through $T_{110}$ are controlled by the relays 131 through 138 which correspond to the eight digits S through Z of an input binary code.

The circuit of FIG. 9B is an enlarged showing of transformer $T_{107}$. It includes the primary winding 140 and the secondary windings 142 and 144. The maximum output voltage developed across the two secondaries of transformer $T_{107}$ with any combination of digits W, X, Y, and Z is equal to the tangent of 11.25° multiplied by the input voltage applied to the primary 140. The relative magnitudes of the voltages appearing at the output of the evaluator made up of transformer $T_{107}$ and its switching contacts are indicated in the table of FIG. 10.

Figure 11A:
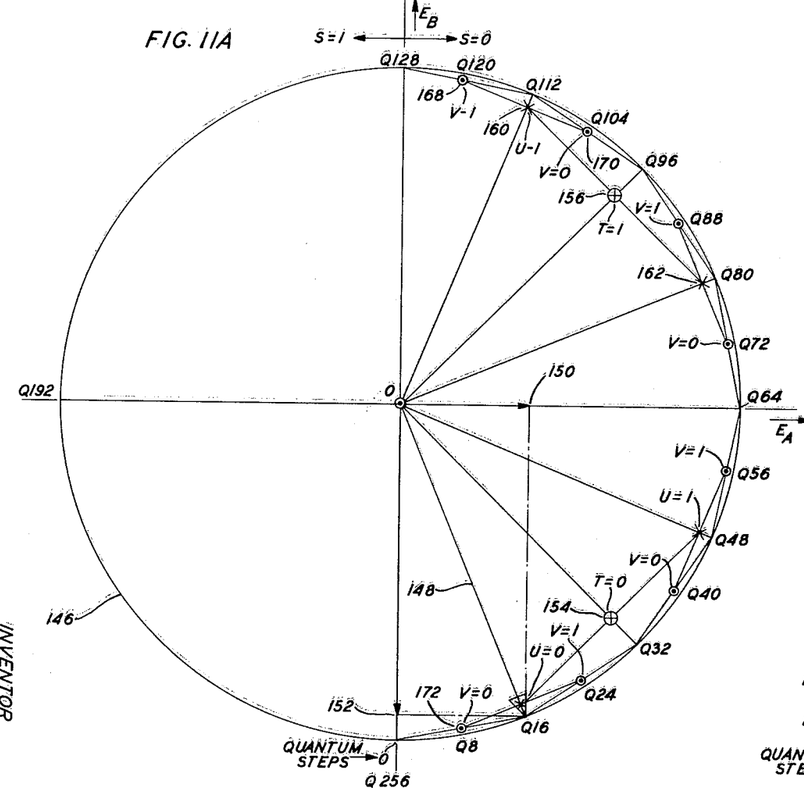
FIGS. 11A, 11B, and 12 are diagrams which are useful in understanding the mode of operation of the circuit of FIGS. 9A and 9B.
Figure 11B:
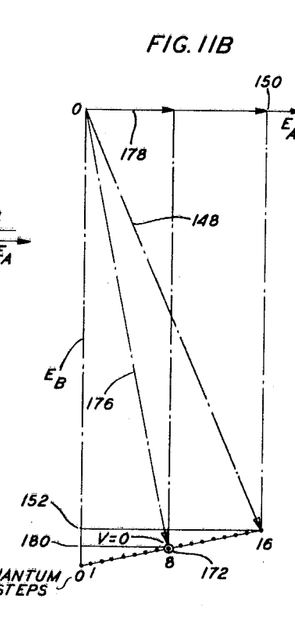

The mode of operation of the circuit of FIG. 9A may be more readily explained in terms of the diagram of FIGS. 11A and 11B. Initially, it may be recalled that the spacial position voltages at the output of the upper and lower channels in the circuit of FIG. 9A must have the general form shown in FIG. 4. More specifically, they must be sine and cosine functions of the same angle. Thus, with reference to FIG. 11A, the projection of a radial vector on the horizontal and vertical axes would constitute voltages fulfilling the requirements of output spacial position voltages such as those shown in FIG. 4. For the purposes of the present analysis, it will be assumed that there is an input signal applied to transformer $T_{101}$, but that there is no input signal applied to transformer $T_{102}$. In addition, the output signal to transformer $T_{110}$ will be taken as the projection of the radial vectors on the horizontal axis designated $E_A$ in FIG. 11A. Similarly, the output $E_B$ to transformer $T_{109}$ will be taken as the projection of a radial vector on the vertical axis designated $E_B$ in FIG. 11A.

As in the case of the reflected binary code, an eight-digit normal binary code includes 256 quantum steps to represent the complete 360° of the circle shown in FIG. 11A. Quantum step 0 appears at the bottom of FIG. 11A, and successive quantum steps are designated along the periphery of circle 146.

Jumping momentarily to the final result which is to be obtained by the circuit of FIG. 9A, it will be assumed that the angle represented by the digital input signals corresponds to quantum 16. The vector 148 corresponds to this digital input signal. Under these circumstances, the projection on the horizontal axis $E_A$ is given by the vector extending from the origin 0 of circle 146 to point 150. Similarly, the projection of vector 148 on axis $E_B$ is the vector extending from the origin 0 to point 152. Voltages having magnitudes corresponding to these vectors appear at the inputs to transformers $T_{110}$ and $T_{109}$, respectively.

The technique for developing the voltages from the two channels of FIG. 9A to correspond to each quantum step along the periphery of the circle 146 will now be considered in detail. Initially, it may be noted that the relay S representing the most significant binary digit merely reverses the polarity of both output signals. This corresponds to a shift of 180° in the signal represented by the spacial position voltages, as may be readily determined by reference to FIG. 4. In terms of the diagram of FIG. 11A, the switching of digit S selects the diametrically opposite vector indicated by the other digital signals. Assuming that digit S is equal to "0," corresponding to the de-energization of relay 131, the right-hand side of circle 146 is selected. Now, with transformer $T_{101}$ being energized and transformer $T_{102}$ being de-energized, it may be seen that the signal applied to transformer $T_{104}$ is the voltage developed across one half of the secondary winding of transformer $T_{101}$. In a similar manner, the voltage developed across transformer $T_{103}$ has the same value. The positions on FIG. 11A corresponding to the voltages developed at the input of transformer $T_{104}$ when digit T is "0" or "1" are indicated by the points 154 and 156, respectively.

Referring to FIG. 9A, it may be noted that the voltage applied to transformer $T_{106}$ is the combination of the input signal applied to transformer $T_{104}$ plus a trimming increment supplied from transformer $T_{103}$ on lead 158. The combination of the two voltages shifts the vector from point 156 to either point 160 or point 162, depending on the value of digit U as registered by relay 133. The magnitude of the trimming voltage supplied by transformers $T_{103}$ and $T_{104}$ across either half of their secondaries is equal to tan 22.5° times the value of the signal applied to the primary of the transformers. This can be developed by a consideration of the geometry of FIG. 11A. The ratio of the primary of each of transformers $T_{103}$ and $T_{104}$ to the first and second secondary windings is therefore equal to 1:tan 22.5°:tan 22.5°, or 1:0.414:0.414.

The signal applied to transformer $T_{108}$ is also made up of the signal applied to transformer $T_{106}$ plus an increment supplied from transformer $T_{105}$ on lead 164. In a similar manner, transformer $T_{107}$ has an input voltage which includes the signal applied to transformer $T_{105}$ plus a trimming voltage supplied from transformer $T_{106}$ on lead 166. In passing, it may be noted that the ratio of transformers $T_{105}$ and $T_{106}$ from the primary to either secondary is equal to 1:tan 11.25°. Assuming that digits T and U are both equal to "1," then the vector at the input of transformer $T_{106}$ would be equal to the projection of the vector extending from the origin to point 160 on the axis $E_A$, and the input voltage at transformer $T_{105}$ would be equal to the projection of the same vector on axis $E_B$. The effect of the final trimming voltages applied at the inputs to transformers $T_{107}$ and $T_{108}$ is to shift the point 160 either to points 168 or 170, depending on the value of digit V. If digit V is equal to "1," corresponding to the energization of relay 134, then point 168 is selected, whereas point 170 is selected when relay 134 is de-energized. In a similar manner, any one of the eight encircled points shown in FIG. 11A may be selected by the choice of proper binary values for digits T, U, and V. It may also be noted that an additional group of eight points (not shown) in the left-hand semicircle of FIG. 11A may be selected by changing the value of digit S.

The energization states of relays W through Z control the magnitude of the voltage increment added to or subtracted from the voltages determined by digits S through V. FIG. 11B indicates diagrammatically the mode of operation of the evaluator circuitry associated with transformers $T_{107}$ and $T_{108}$ in FIG. 9A. In FIG. 11B, the vertical line corresponds to the axis $E_B$, and the right-hand line from the origin to quantum step 16 is the vector 148, discussed above in connection with FIG. 11A. The center point corresponds to one condition in which the relay V equals "0", and this point is designated by the reference numeral 172 in both FIGS. 11A and 11B. As indicated in the table of FIG. 10, the evaluators, including the transformers $T_{107}$ or $T_{108}$ and their associated relay contacts, provide positive and negative incremental voltages to be added to the voltages represented by positions designated V in the diagram of FIG. 11A. This arrangement essentially corresponds to stepping the voltages across a chord of the circle 146 to approximate the vectors extending to the periphery of circle 146.

The phenomenon which is utilized in this stage of the angular difference circuitry involves the relationship between the slope and the magnitudes of the approximate voltages developed at the input to transformer $T_{105}$. Specifically, it turns out that the slope of the sine approximation is proportional to the magnitude of the cosine approximation in each case. This corresponds to the well known fact that the differential of a sine function is the cosine function. It may also be confirmed qualitatively from the plots of FIG. 4, in which it may be noted that the sine and cosine wave forms have a relatively shallow slope when their magnitude is relatively great, and have increasing slopes as their magnitudes decrease.

Referring again to FIG. 11B, the vector 176 extends from the origin 0 to point 172. As indicated in the table of FIG. 10, when digit W is equal to "1" and digits X, Y, and Z all have the value "0", the output from the evaluator circuits is equal to zero. Under these circumstances, the projection of vector 176 on the axis $E_A$ is the vector 178, and the projection of the vector 176 on axis $E_B$ is the distance from the origin to point 180. Assuming that the values of digits W, X, Y, and Z are all "1", the evaluator associated with transformer $T_{107}$ produces an output value equal to seven-eighths tan 11.25°. This increment shifts vector 176 from quantum 8 to quantum 15, which is the next to last quantum step on the lower line of FIG. 11B. The vector 148 to quantum step 16 corresponds to the first step in the next group of sixteen steps. The increment provided by the evaluator circuitry associated with transformer $T_{107}$ is coupled to transformer $T_{110}$ by the leads 182 and 184, and increases the magnitude of the voltage from the value indicated by vector 178 to the magnitude indicated by the vector extending from the origin to point 150 in FIG. 11A. In a similar manner, the evaluator circuitry associated with transformer $T_{108}$ produces a small negative value which is added to the signal at the primary of transformer $T_{107}$. This negative increment is coupled to the signal at the primary of transformer $T_{107}$ by leads 186 and 188. This has the effect of reducing the magnitude of the signal at the input of transformer $T_{109}$ by a voltage equivalent to the space between points 152 and 180. In a similar manner, other combinations of the digital signals W, X, Y, and Z produce evaluator voltages which may be combined with the signals at the inputs of transformers $T_{107}$ and $T_{108}$ to produce pairs of output voltages at transformers $T_{109}$ and $T_{110}$, respectively, representing each of the 256 quantum steps provided by the digital input signals.

For the purposes of FIGS. 11A and 11B, certain simplifying assumptions were made. Specifically, it was assumed that transformer $T_{101}$ was energized and that transformer $T_{102}$ was not energized. This had the effect of simplifying the diagram of FIG. 11B by orienting the 0 quantum point on the circle 146 at the intersection of the $E_B$ axis.

Figure 12:
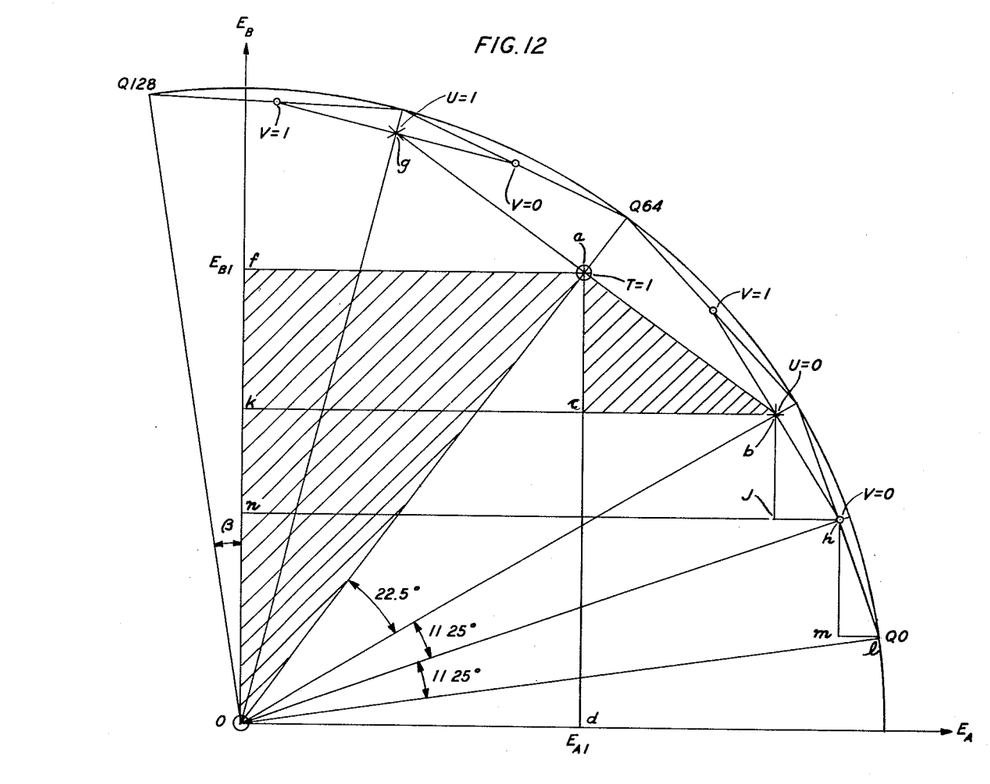

For the purposes of FIG. 12, however, the more general case of unequal energization of transformers $T_{101}$ and $T_{102}$ is considered. In the course of the following description, it will be shown that the trimming increments supplied from one channel to the other in the circuit of FIG. 9A have the proper magnitude under these generalized conditions.

In the diagram of FIG. 12, the angle represented by the input spacial voltages from the transformers $T_{101}$ and $T_{102}$ is shifted by $\beta$ degrees from the reference position diagrammed in FIG. 11A. In FIG. 12, only a little more than one quadrant is shown. However, the operation in the other quadrants is entirely analogous and presents no difficulty. With the shift in the voltages applied to transformers $T_{101}$ and $T_{102}$ in FIG. 9A, the input voltages received at the primaries of transformers $T_{103}$ and $T_{104}$ are no longer equal. They do, in fact, correspond to the projections of the vector $oa$ on the axes $E_A$ and $E_B$. These vectors are $od$ and $fo$, respectively. Accordingly, the voltage applied to transformer $T_{104}$ is somewhat less than that applied to transformer $T_{103}$.

The points $g$ and $b$ in FIG. 12 correspond to two possible values of the digit U, as indicated by the state of relay 133 in FIG. 9A. Considering the point $b$ which corresponds to the situation when digit T is "1" and digit U is equal to "0", it may be noted that the shift in axes of FIG. 12 has produced a change in the trimming voltages produced by transformers $T_{103}$ and $T_{104}$. Instead of being of equal value, as in the case considered in the diagram of FIG. 11A, the trimming voltage for the lower channel $E_A$ must be increased, and the trimming voltage for channel $E_B$ must be decreased. From a qualitative standpoint, it may be seen initially that this requirement is implemented by the increased voltage present at the primary of transformer $T_{103}$ and the reduced voltage available at the primary of transformer $T_{104}$. The cross-connection from the secondary of transformer $T_{103}$ to the input of transformer $T_{106}$ produces the desired increased increment in the lower channel $E_A$; and the reduced voltage at the input of transformer $T_{104}$ produces the required trimming increment of reduced magnitude at the input of transformer $T_{105}$.

On a more rigorous basis, it may be shown that the trimming voltage $ac$ for channel $E_B$ and the trimming voltage $cb$ for the lower channel $E_A$ are proportional to the values of the original voltages $af$ and $fo$ applied to the primaries of transformers $T_{104}$ and $T_{103}$, respectively. The validity of the foregoing statement may be shown from the fact that triangle $acb$ is similar to triangle $afo$. To show that these triangles are similar, it may first be noted that the angles $afo$ and $acb$ are both right angles. In addition, the line $ab$ is perpendicular to line $ao$, and the line $ac$ is perpendicular to the line $af$. Accordingly, angles $cab$ and $fao$ are equal, and the triangles are similar. With triangles $afo$ and $acb$ shown to be similar, the following relationship exists.

$$\frac{cb}{fo} = \frac{ac}{fa} = \frac{ab}{ao} = \tan 22.5° \qquad (11)$$

$$ac = fa \tan 22.5° \qquad (12)$$

$$cb = fo \tan 22.5° \qquad (13)$$

In connection with the angle of 22.5°, it may be noted that this is the smaller acute angle of the right triangle $bao$.

In comparing Expressions 12 and 13 with the circuitry in FIG. 9A which is employed to instrument these relationships, it may be recalled that transformers $T_{103}$ and $T_{104}$ each have a stepdown ratio of 1:tan 22.5° from the primary winding to either of the secondary windings. In addition, a voltage corresponding to the line $fo$ in FIG. 12 is present at the input to transformer $T_{103}$, and a voltage corresponding to the line $od$ in FIG. 12 is present at the input to transformer $T_{104}$. The lead 158 from the secondary of transformer $T_{103}$ to the primary of transformer $T_{106}$ carries a trimming increment equal to $fo \tan 22.5°$. From Equation 13 above, this is equal to the desired trimming increment $cb$ which is necessary to arrive at point $b$ from point $a$ in the diagram of FIG. 12. In a similar manner, the increment $ac$ is coupled from the secondary of transformer $T_{104}$ to the primary of transformer $T_{105}$.

It may also be shown geometrically that the following relationships obtain with respect to the location of points $h$ and $l$. For example, the critical relationships are set forth below.

$$\angle kbo = \angle jbh \qquad (14)$$

$$\triangle kbo \sim \triangle jbh \qquad (15)$$

$$\frac{jh}{ok} = \frac{bj}{kb} = \frac{bh}{ob} = \tan 11.25° \qquad (16)$$

$$\angle mhl = \angle nho \qquad (17)$$

$$\triangle mhl \sim \triangle nho \qquad (18)$$

$$\frac{ml}{no} = \frac{hm}{hn} = \frac{hl}{oh} = \tan 11.25° \qquad (19)$$

The cross-connections between the upper and lower channels of FIG. 9A again serve to implement the relationships indicated in Expressions 14 through 19 set forth above. The nature of the cross-connections between transformers $T_{105}$, $T_{106}$, and transformers $T_{107}$, $T_{108}$ are entirely analogous to the cross-connections between transformers $T_{103}$ through $T_{106}$.

In the foregoing description of FIG. 12, the validity of the circuitry of FIG. 9A in performing the disclosed functions has been shown. This concludes the detailed description of the circuits which have been employed to illustrate the present invention. It may be noted that the circuits could have input signals of the two spacial position voltage type rather than the three-phase input disclosed in FIGS. 5 and 9A. In addition, other impedance networks could be employed. Resistors could readily be used; however, they have the disadvantage of introducing loss. Transformers with less complicated winding arrangements could be employed, but at the expense of additional relay contacts. In the present circuits, switching speed was considered important, and small relays having few contacts were used. Other digital input signals could also have been employed to represent one of the angles. If other digital input signals are used, the signals would be converted directly into one of the binary numbering systems disclosed in detail above. Alternatively another direct impedance switching system patterned broadly after those disclosed above could be utilized. It may also be noted that the present circuits could readily be used to add angles rather than subtract them. For specific example, the circuit of FIG. 5 could be made to effectively add the two input angles rather than subtract them by interchanging a pair of input leads to transformers $T_1$ and $T_2$ and a corresponding pair of output leads from transformers $T_{19}$ and $T_{20}$.

It is again noted that the combinational converters of the present invention may be substituted in servo systems in place of mechanical differential servo equipment and a rebalancing servo system. As mentioned above, the advantages of the present system include significant reductions in the cost, bulk, and power requirements of the control system. In addition, the response time of the present system is much less than that of the prior system. The time delay of the present system is substantially constant and is equal to the delay in the operation of input relays. The delay, resulting from the time required for servo rebalancing and from mechanical inertial effects for the systems of the prior art, is much greater than the delay of the present system.

It is to be understood that the above-described arrangements are illustrative of the application of the principles of the invention. Numerous other arrangements may be devised by those skilled in the art without departing from the spirit and scope of the invention.

What is claimed is:

1. Apparatus for producing output voltages representative of the difference between two shaft positions located at remote points comprising means for receiving spacial voltages representative of the position of a first shaft, means for receiving digital code groups representative of the position of a second shaft, voltage approximation means responsive to a plurality of the more significant code digits for simultaneously weighting said significant digits and modulating said spacial voltages in accordance with said weighting to produce voltage magnitudes indicative of the shaft position difference to a first approximation, and linear evaluation means responsive to the remaining code digits for receiving said first approximation voltages and simultaneously weighting said remaining code digits to adjust the magnitude of said first approximation voltages in accordance with said evaluation weighting to produce output voltages indicative of the shaft position difference.

2. In combination, a source of first and second input voltages having amplitude characteristics approximately 90 degrees out of phase, said voltages representing a variable angle, a switching circuit for registering digital input signals representing another angle, and an impedance network coupled to said source of voltages and controlled by said switching circuit for providing third and fourth voltages which have magnitudes which are sine and cosine functions of an algebraic combination of said first and second angles.

3. In combination, circuitry for providing a set of variable spacial input voltages having amplitude characteristics approximately 90 degrees out of phase, said voltages representing a variable angle, a switching circuit for registering digital input signals representing another angle, and an impedance network coupled to said source of voltages and controlled by said switching circuit for providing another set of variable spacial voltages representing an algebraic combination of said angles.

4. A system for synthesizing spacial output voltages from a combination of input spacial voltages and digital signals representing another combination of spacial voltages, comprising means for providing a pair of variable input spacial signals having amplitude characteristics approximately 90 degrees out of phase, an electrical impedance network including a first channel and a second channel, first and second switching networks for applying different combinations of said first and second spacial signals to said channels, and a source of digital input signals connected to control said switching networks.

5. A system for synthesizing spacial output voltages from a combination of input spacial voltages and digital signals representing another combination of spacial voltages, comprising means for providing a pair of variable input spacial signals having amplitude characteristics approximately 90 degrees out of phase, an electrical network including a first channel and a second channel, first and second switching circuits for applying different combinations of said first and second spacial signals to said channels, said first and second channels including additional switching means for progressively approximating a sine and cosine function of an angle which is algebraically related to the angle represented by the original pair of spacial voltages, and a source of digital input signals connected to control said switching networks.

6. In combination, means for providing a pair of variable spacial input signals representing an angle, an impedance network including two channels, means for coupling said pair of input signals to said two channels, cross-connections between said two channels of said impedance network, a source of digital input signals representing another angle, a plurality of individual digit registration means coupled to said source of digital input signals, switching circuits controlled by each digit registration means, and means responsive to the selective energization of said switching circuits for changing said cross-connection to modify said pair of input spacial signals by an amount corresponding to the angle represented by said digital signals.

7. An apparatus for producing output voltages representative of an algebraic combination of two angles derived at different points comprising means for receiving spacial voltages representing the first angle, means for receiving binary code groups representing the second angle, means responsive to a plurality of the more significant code digits for simultaneously weighting said significant digits and modulating said spacial voltages in accordance with said weighting to produce voltage magnitudes indicative of the combination of angles to a first approximation, and evaluation means responsive to the remaining code digits for receiving said first approximation voltages and simultaneously weighting said remaining code digits to adjust the magnitude of said first approximation voltages in accordance with said evaluation weighting to produce output voltages which more closely represent the combination of angles.

8. In combination, a source of first and second input voltages having amplitude characteristics approximately 90 degrees out of phase, said voltages representing a variable angle, a switching circuit for registering digital input signals representing another angle, and means including an impedance network coupled to said source of voltages and controlled by said switching circuit for providing third and fourth voltages which have magnitudes which are sine and cosine functions of a combination of said first and second angles.

9. In combination, means for providing a set of variable spacial input voltages having amplitude characteristics approximately 90 degrees out of phase, said voltages representing a variable angle, a switching circuit for registering digital input signals representing another angle, and means including an impedance network coupled to said source of voltages and controlled by said switching circuit for providing another set of variable spacial voltages representing a combination of said angles.

10. A combination as defined in claim 9 wherein said digital input signals are in the normal binary code, said impedance network includes two channels having many cross-connections, and wherein said switching circuit controls the nature of said cross-connections to provide the trimming voltages required to produce the spacial voltages representing the combination of angles.

11. A combination as defined in claim 9 wherein said digital signals are in the reflected binary code and wherein switching circuitry associated with each digit of the code and said impedance network includes means for modifying the value of the output set of spacial voltages in accordance with the values indicated by the reflection lines associated with a preselected digit of the input code.

References Cited in the file of this patent

UNITED STATES PATENTS

| | | |
|---|---|---|
| 2,330,088 | St. Palley | Sept. 21, 1943 |
| 2,599,889 | Briggs et al. | June 10, 1952 |
| 2,710,962 | Fritze | June 14, 1955 |
| 2,808,547 | Adler | Oct. 1, 1957 |
| 2,814,006 | Wilde | Nov. 19, 1957 |
| 2,820,937 | Fogiel | Jan. 21, 1958 |
| 2,853,699 | O'Neil | Sept. 23, 1958 |
| 2,967,017 | Tripp | Jan. 3, 1961 |
| 2,969,534 | Fisher | Jan. 24, 1961 |